US006826590B1

(12) United States Patent
Glanzer et al.

(10) Patent No.: US 6,826,590 B1
(45) Date of Patent: Nov. 30, 2004

(54) BLOCK-ORIENTED CONTROL SYSTEM ON HIGH SPEED ETHERNET

(75) Inventors: David A. Glanzer, Georgetown, TX (US); Colin R. Corles, Phoenix, AZ (US); Steven K. Brodman, Needham, MA (US); William M. Hawkins, Bloomington, MN (US); Michael D. Hirst, Lakeville, MA (US); Tony J. Kozlik, Phoenix, AZ (US); Lee A. Neitzel, Austin, TX (US); Raymond D. Sawyer, Raynham, MA (US); Johan I. Tegnell, Mansfield, MA (US)

(73) Assignee: Fieldbus Foundation, Austin, TX (US)

( * ) Notice: Subject to any disclaimer, the term of this patent is extended or adjusted under 35 U.S.C. 154(b) by 744 days.

(21) Appl. No.: 09/598,697

(22) Filed: Jun. 21, 2000

Related U.S. Application Data (63) Continuation-in-part of application No. 08/916,178, filed on Aug. 21, 1997.
(60) Provisional application No. 60/139,814, filed on Jun. 21, 1999, and provisional application No. 60/024,346, filed on Aug. 23, 1996.

(51) Int. Cl.[7] .................... G06F 15/16; G06F 15/173
(52) U.S. Cl. .................... 709/200; 709/223; 709/224; 370/249
(58) Field of Search ................... 709/223, 224, 709/200; 370/249; 714/4

(56) References Cited

U.S. PATENT DOCUMENTS

| 4,969,083 A | 11/1990 | Gates |
| 4,992,926 A | 2/1991 | Janke et al. |

(List continued on next page.)

FOREIGN PATENT DOCUMENTS

| WO | WO 98/02993 | 1/1998 |
| WO | WO 99/48245 | 9/1999 |

OTHER PUBLICATIONS

File History: Peer–To–Peer Register Exchange Controller for Industrial Programmable Controllers; U.S. patent No. 4,992,926, Application Ser. No. 07/258,779, Feb. 12, 1991; Janke et al., filed Oct. 17, 1988.

(List continued on next page.)

*Primary Examiner*—Frantz B. Jean
(74) *Attorney, Agent, or Firm*—Dorsey & Whitney LLP (57) ABSTRACT

A distributed control system architecture (HSE) provides an open, interoperable solution optimized for integration of distributed control systems and other control devices in a high performance backbone, provides an open, interoperable solution that provides system time synchronization suitable for distributed control applications operable over a high performance backbone, and provides an open, interoperable solution that provides a fault tolerant high performance backbone as well as fault tolerant devices that are connected to the backbone. The distributed control system architecture comprises a High speed Ethernet Field Device Access (HSE FDA) Agent, which maps services of a distributed control system, e.g., a fieldbus System, to and from a standard, commercial off-the-shelf (COTS) Ethernet/Internet component. The distributed control system architecture also comprises a High speed Ethernet System Management Kernel (HSE SMK) that operates to keep a local time, and keeps the difference between the local time and a system time provided by a time server within a value specified by the time sync class. The local time is used to time stamp events so that event messages from devices may be correlated across the system. The distributed control system architecture further comprises a High speed Ethernet Local Area Network Redundancy Entity (HSE LRE) that provides redundancy transparent to the applications running on the system. The HSE LRE of each device periodically transmits a diagnostic message representing its view of the network to the other Devices on the system. Each device uses the diagnostic messages to maintain a Network Status Table (NST), which is used for fault detection and selection from a redundant pair of resources.

32 Claims, 8 Drawing Sheets

U.S. PATENT DOCUMENTS

| | | | |
|---|---|---|---|
| 5,131,092 A | | 7/1992 | Sackmann et al. |
| 5,151,978 A | | 9/1992 | Bronikowski et al. |
| 5,159,673 A | | 10/1992 | Sackmann et al. |
| 5,245,704 A | | 9/1993 | Weber et al. |
| 5,251,302 A | | 10/1993 | Weigl et al. |
| 5,506,956 A | | 4/1996 | Cohen .......................... 714/6 |
| 5,608,720 A | * | 3/1997 | Biegel et al. ................ 370/249 |
| 5,764,955 A | * | 6/1998 | Doolan ........................ 709/223 |
| 5,805,442 A | | 9/1998 | Crater et al. |
| 5,828,851 A | | 10/1998 | Nixon et al. .................. 395/285 |
| 5,859,959 A | * | 1/1999 | Kimball et al. ................. 714/4 |
| RE36,263 E | | 8/1999 | Janke et al. |
| 5,960,214 A | | 9/1999 | Sharpe, Jr. et al. ......... 395/835 |
| 5,970,430 A | | 10/1999 | Burns et al. ................. 702/122 |
| 5,975,737 A | | 11/1999 | Crater et al. |
| 5,978,578 A | | 11/1999 | Azarya et al. ............... 395/701 |
| 5,982,362 A | | 11/1999 | Crater et al. |
| 6,014,612 A | | 1/2000 | Larson et al. ................ 702/183 |
| 6,026,352 A | | 2/2000 | Burns et al. ................. 702/182 |
| 6,032,208 A | | 2/2000 | Nixon et al. ................... 710/64 |
| 6,044,305 A | | 3/2000 | Larson et al. .................. 700/87 |
| 6,047,222 A | | 4/2000 | Burns et al. .................... 700/79 |
| 6,061,603 A | | 5/2000 | Papadopoulos et al. |
| 6,151,625 A | | 11/2000 | Swales et al. |
| 2001/0003804 A1 | | 6/2001 | Papadopoulos et al. |

OTHER PUBLICATIONS

File History: Distributed Interface Architecture For Programmable Industrial Control Systems; U.S. patent No. 5,805,442, Application Ser. No. 08/655,469, Sep. 8, 1998; Crater et al., filed May 30, 19.

File History: Distributed Interface Architecture For Programmable Industrial Control Systems; U.S. patent No. 5,975,737, Application Ser. No. 09/112,583, Nov. 2, 1999; Crater et al., filed Jul. 9, 1998.

Frans Middeldorp, et al., "CPS 1259 Foreign Device Interface", Nov. 3, 1987, pp. 1–11.

Ed Shaughnessy, "DFS 1592 Master Timekeeper", Mar. 19, 1986, pp. 1–32.

Frans Middeldorp, et al., "DFS 2929 Foreign Device Interfaces", Oct. 2, 1987, pp. 1–13.

Elias Drakopoulos, "Enterprise Network Planning and Design: Methodology and Application", Computer Communications 22 (1999) 340–352.

Jiying HE, et al., "Clock Synchronization in Real–Time Distributed Systems Based on Flip Field Bus", Centre de Recherche en Informatique de Nancy, Sep. 30, 1990, pp. 135–141.

Henrik Lonn, et al., "Synthronisation in Safety–Critical Distributed Control Systems", Chalmers University of Technology, Laboratory for Dependable Computing, Apr. 19, 1995, pp. 891–899.

Alan Olson, et al., "Probabilistic Clock Synchronization in Large Distributed Systems", Real–Time Computing Laboratory, May 20, 1991, pp. 290–297.

P. Arpaia, et al., A Distributed Laboratory Based on Object–Oriented Measurement Systems, Measurement vol. 19, No. 3/4, pp. 207–215, 1996.

Raymond Seng–Sim Cheah, et al., Design and Implementation of an MMS Environment on Isode, Computer Communications 20 (1997) 1354–1364.

Elias Drakopoulos, "Enterprise Network Planning and Design: Methodology and Application", Computer Communications 22 (1999) 340–352.

Jiying He, et al., "Clock Synchronization in Real–Time Distributed Systems Based on FIP Field BUS", Centre de Recherche en Informatique de Nancy, Sep. 30, 1999, pp. 135–141.

Henrik Lonn, et al., "Synchronisation in Safety–Critical Distributed Control Systems", Chalmers University of Technology, Laboratory for Dependable Computing, Apr. 19, 1995, pp. 891–899.

Alan Olson, et al., "Probabilistic Clock Synchronization In Large Distributed Systems", Real–Time Computing Laboratory, May 20, 1991, pp. 290–297.

Frans Middeldorp, et al., "CPS 1259 Foreign Device Interface", Nov. 3, 1987, pp. 1–11.

* cited by examiner

BLOCK-ORIENTED CONTROL SYSTEM ON HIGH SPEED ETHERNET

CROSS-REFERENCE TO RELATED APPLICATIONS

This application is a continuation-in-part (CIP) application of U.S. application Ser. No. 08/916,178 filed Aug. 21, 1997, and is related to and claims priority from U.S. Provisional Application No. 60/024,346 filed Aug. 23, 1996, and U.S. Provisional Application No. 60/139,814 filed Jun. 21, 1999, all of which are hereby incorporated by reference in their entirety.

TECHNICAL FIELD

The present invention relates to control system architecture. More particularly, the present invention relates to an open, interoperable distributed control system in a high performance network environment.

BACKGROUND OF THE INVENTION

Automatic control systems are critical to all sectors of industry such as process control, discrete control, batch control (process and discrete combined), machine tool control, motion control, and robotics. One of the strongest needs in modern control systems is development and use of "open" and "interoperable" systems. Open, interoperable systems allow control devices made by different manufacturers to communicate and work together in the same system without the need for custom programming. "Fieldbus" is the common term used to describe these types of control systems.

The movement toward open, interoperable fieldbus systems is driven by device manufacturers and end users. Manufacturers want open, interoperable systems because it allows them to sell their products to more end users while reducing development costs. End users want open, interoperable systems so that they can select the best control devices for their system regardless of the device manufacturer.

There has also been a trend toward distribution of control functions into intelligent devices. In centralized control systems, a central controller performs all the control functions.

In distributed control systems, more than one control device operating in the system takes an active role in the control functions. Although both centralized and decentralized systems use a communication network, decentralized systems reduce overall system costs by reducing or eliminating the centralized controller functions between the control devices and the human-machine interface.

In order for distributed control systems to be truly open and interoperable, both the communications system and the user layer (above the communication system layers) must be specified and made open. One of the truly open and interoperable distributed systems is the fieldbus system provided by the Fieldbus Foundation. The FOUNDATION™ fieldbus user layer is described, e.g., in U.S. patent application Ser. No. 08/916,178 (hereafter the "178" application) filed Aug. 21, 1997, entitled "BLOCK-ORIENTED CONTROL SYSTEM", and assigned to the assignee of the present application.

The lower speed 31.25 kilobits per second fieldbus (H1) used by the FOUNDATION™ fieldbus is described in part by International Electrotechnical Committee (IEC) Standard IEC 61158, the entirety of which is hereby incorporated by reference herein.

While the FOUNDATION™ fieldbus provides the open and interoperable solution for the H1 control capability, there is a great need to provide an open and interoperable solution for distributed control on a very high performance communication system typically called a fieldbus "backbone" network. The backbone network aggregates information from the lower speed control devices, e.g., the H1 and other control devices, which is used in supervisory and advanced control applications. The backbone is also needed for integration of control information into the enterprise's Management Information Systems (MIS).

One of the widely accepted standards for high performance communications signaling is Ethernet. Invented by Xerox in the 1970's, Ethernet has progressed from an initial speed of 10 Megabits per second, to 100 Megabits per second, to 1 Gigabit per second and beyond. Ethernet signaling is specified in an Institute of Electrical and Electronics Engineers (IEEE) standard (IEEE 802.3). Ethernet signaling is the underlying technology used by the Internet. The Internet protocols are specified by the Internet Engineering Task Force (IETF) and are issued as Request For Comment (RFC) specifications.

Although Ethernet/Internet technology provides the basic services for a high performance fieldbus backbone, it does not provide for all of the functions needed for use in distributed control systems. In particular, IEEE and IETF do not have suitable open and interoperable solutions for integration of distributed control systems (e.g., the H1 subsystem), system time synchronization, and fault tolerance.

The method of transferring information from lower speed fieldbuses to the Ethernet used by organizations such as Open DeviceNet™ Vendor Association, Inc., ("EtherNet/IP,") and PROFIBUS International, ("PROFINet") are not suitable for use in the high performance environment because they encapsulate the lower speed protocol packets in an Ethernet frame. This method, known as "tunneling," is common in centralized control systems, but is inadequate for high performance distributed control systems. Although simpler to specify, tunneling would require too many Transport Control Protocol (TCP) connections with the resulting interrupt processing and memory overhead on the devices connected to the fieldbus backbone. In addition tunneling wastes much of the Ethernet bandwidth because the lower speed protocol packets (e.g., the H1 packets) are small and in many cases the Ethernet packet overhead would be bigger than a lower speed protocol packet.

Devices connected to the Ethernet must have a common sense of system time for time stamp and function block scheduling (control) purposes. For high performance distributed control, system time often needs to be accurate to within less than 1 millisecond. Heretofore, there is no known solution that provides this accuracy using the Commercial Off The Shelf (COTS) Ethernet equipment.

Fault tolerance of the Ethernet communication media and devices connected to the Ethernet is required for high performance distributed control applications. There is no known solution that provides the required fault tolerance using standard COTS Ethernet equipment. All of the prior attempts in providing the required fault tolerance require special Ethernet/Internet electronic hardware and/or software, and/or a non-standard "redundancy manager" device to be added to the Ethernet.

Thus, what is needed is an open, interoperable solution optimized for integration of distributed control systems and other control devices in a high performance fieldbus backbone.

What is also needed is an open, interoperable solution that provides system time synchronization suitable for distributed control applications operable over a high performance fieldbus backbone.

What is also needed is an open, interoperable solution that provides a fault tolerant high performance fieldbus backbone as well as fault tolerant devices that are connected to the fieldbus backbone.

SUMMARY OF THE INVENTION

The present invention overcomes the shortcomings described above and provides a new and improved distributed control system, which operates on a high performance backbone, e.g., the standard COTS Ethernet and Internet technology. The embodiments of the present invention are collectively referred to herein as the "High Speed Ethernet" (HSE). HSE includes the features of the distributed control system described by the '178 application and FOUNDATION™ fieldbus specifications (which are listed in Appendix A as the Reference Set 1), and further includes three new protocols described in the supporting specifications thereof, which are listed in Appendix A as the Reference Set 2. In particular, the new protocols are referred to herein as: the HSE Field Device Access (FDA) Agent, the HSE System Management Kernel (SMK), and the HSE Local Area Network Redundancy Entity (LRE).

The HSE FDA Agent allows System Management (SM) and Fieldbus Message Specification (FMS) services used by the H1 devices to be conveyed over the Ethernet using standard Internet User Data Protocol (UDP) and Transport Control Protocol (TCP). This allows HSE Devices on the Ethernet to communicate to H1 devices that are connected via a "HSE Linking Device." The HSE FDA Agent is also used by the local Function Block Application Process (FBAP) in a HSE Device or HSE Linking Device. Thus, the HSE FDA Agent enables remote applications to access HSE Devices and/or H1 devices through a common interface.

The HSE SMK ensures that system level functions in each device are coordinated. These functions include system time, addition and removal of devices from the network, and function block scheduling. HSE SMK uses local clock that operates to keep a local time, and keeps the difference between the local time and a system time provided by a time server within a value specified by the time sync class (See Reference Set 1 of Appendix A herein). The local time is used to time stamp events so that event messages from devices may be correlated across the system. Local time is also used to schedule the execution of the local function blocks.

HSE fault tolerance is achieved by operational transparency i.e., the redundancy operations are not visible to the HSE applications. This is necessary because HSE applications are required to coexist with standard MIS applications. The HSE LRE coordinates the redundancy function. Each HSE Device periodically transmits a diagnostic message representing its view of the network to the other HSE Devices on its Ethernet interfaces (commonly called Ethernet "Ports"). Each device uses the diagnostic messages to maintain a Network Status Table (NST), which is used for fault detection and Ethernet transmission port selection. There is no central "Redundancy Manager". Instead, each device determines how it should behave in response to faults it detects.

BRIEF DESCRIPTION OF THE DRAWINGS

Features and advantages of the present invention will become apparent to those skilled in the art from the following description with reference to the drawings, in which.

DETAILED DESCRIPTION OF THE PREFERRED EMBODIMENT

For simplicity and illustrative purposes, the principles of the present invention are described by referring mainly to exemplary embodiments, particularly, with specific exemplary implementations of distributed control system in an Ethernet network. However, one of ordinary skill in the art would readily recognize that the same principles are equally applicable to, and can be implemented in, other implementations and designs using any other high speed networks, and that any such variation would be within such modifications that do not depart from the true spirit and scope of the present invention.

A: HSE Distributed Control System Overview

Figure 1:
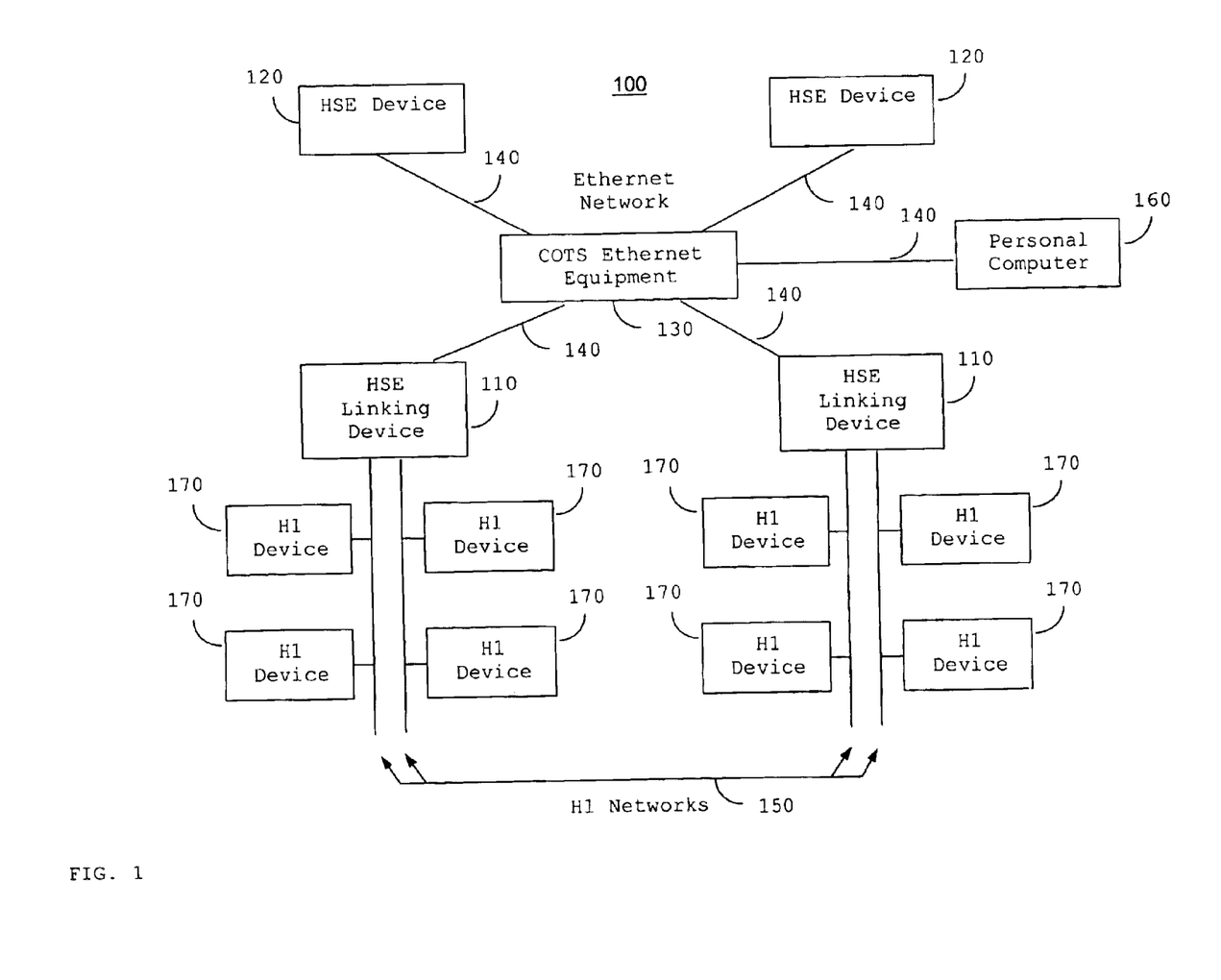
FIG. 1 is a block diagram showing an exemplary embodiment of a high performance distributed control system in accordance with the principles of the present invention.

Referring to FIG. 1, an example of a high performance control system 100 is shown where standard COTS Ethernet equipment 130 is used to interconnect HSE Linking Devices 110 and HSE Devices 120 to an Ethernet Network 140. The HSE Linking Devices 110 in turn connect to H1 Devices 170 using H1 Networks 150. Other types of equipment such as a Personal Computer (PC) 160 may also be connected to the Ethernet Network 140.

The actual Ethernet network topology and COTS Ethernet equipment configuration will depend on the particular application needs. However any Ethernet network topology or configuration using standard COTS Ethernet equipment other than the exemplary topology shown in FIG. 1 may be used, and such variations would be within such modifications that do not depart from the true spirit and scope of the present invention.

A.1: HSE System Architecture

Figure 2:
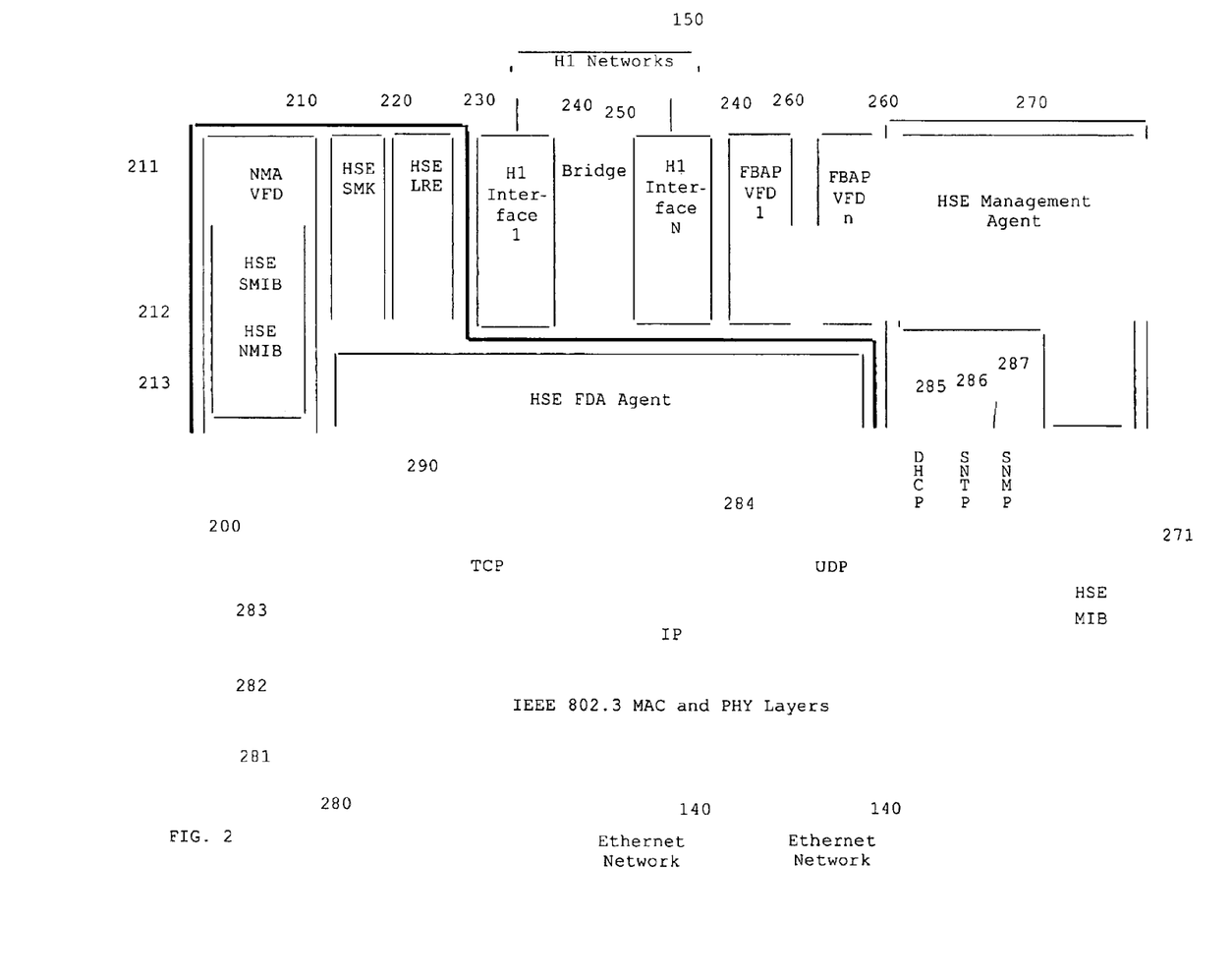
FIG. 2 is a block diagram showing an exemplary embodiment of device system architecture of a high performance distributed control system in accordance with the principles of the present invention.

The HSE system architecture in accordance with an embodiment of the principles of the present invention is shown in FIG. 2. The HSE system architecture is designed to meet the functional needs of the high performance distributed manufacturing and process control environments, e.g., in a high speed Ethernet network. It permits distributed automation systems to be constructed from various control and measurement devices manufactured by different vendors. The HSE system architecture is described by architecture components that have been adapted to the specifics of both the H1 and HSE environments.

The various protocols and standards referenced in the following disclosure are described in detail in the manuals and specifications listed in Appendix A herein, which are available from the Fieldbus Foundation, a not-for-profit organization headquartered in Austin, Texas, and the respective current versions as of the filing date of the present invention of all of which are hereby incorporated by reference in their entirety herein. Each of the architecture components of the HSE system architecture (shown in FIG. 2) will now be described in more detail.

A.2: Function Block Application Process Virtual Field Device (FBAP VFD)

Application Process (AP) is a term defined by the International Standards Organization (ISO) Open Systems Interconnect (OSI) Reference Model (RM), ISO 7498, to describe the portion of a distributed application that is resident in a single device. The term is used in the following description to refer to the entities within a device that performs a related set of functions, such as function block processing, network management, and system management.

Virtual Field Device (VFD) is a term defined by the Fieldbus Foundation (See Fieldbus Message Specification FF-870 listed in Reference Set 1 in Appendix A herein). A VFD makes the parameters of an AP visible to a communication network.

In accordance with the principles of the present invention, the HSE system architecture (shown in FIG. 2) supports the Function Block Application Process Virtual Field Device (FBAP VFD) 260. The FBAP VFD 260 provides a common means for defining inputs, outputs, algorithms, control variables, and behavior of the automation system. There may be multiple FBAP VFDs 260, e.g., n FBAP VFDs as shown, in a device in order to satisfy the particular needs an application. The FBAP VFD may or may not be present in an HSE Device or HSE Linking Device. If the HSE FBAP VFD is present, the device is sometimes also referred to as a "HSE Field Device." In the following descriptions, however, the FBAP VFD is to be assumed to be present in the HSE Device and HSE Linking Device, even if the term "HSE Field Device" is not used.

A standard set of function block classes and parameters are defined by the Fieldbus Foundation, e.g., in one or more of the specifications listed in Appendix A herein. Manufacturers of control devices may append their own parameters to the standard set of parameters to accommodate additional function block definitions as new requirements are discovered, and as technology advances. A more detailed description of the function block classes and parameters may be found, e.g., in Function Block Application Process-Part 1 Specification FF-890 listed in Reference Set 1 of Appendix A herein.

A.3: H1 Interface

Each H1 Network 150 attached to a HSE Linking Device 110 (shown in FIG. 1) requires a H1 Interface 240. The Bridge 250 is used to convey H1 Network messages directly between other H1 Interfaces 240 within the same HSE Linking Device 110 (shown in FIG. 1). A HSE Linking Device may comprise, e.g., a HSE Device 120 (shown in FIG. 1) that includes at least one H1 Interface 240.

A more detailed description of a H1 Interface may be found in the Fieldbus Message Specification FF-870, Fieldbus Access Sublayer Specification FF-821, Data Link Services and Data Link Protocol Specifications FF-821, 822, and Data Link Protocol Specification for Bridge Operation Addendum FF-806, all of which are listed in the Reference Set 1 of Appendix A herein.

A.4: Ethernet/Internet Stack.

The HSE system architecture uses a standard COTS Ethernet/Internet ("stack") 280 for communication with other devices on the Ethernet Network 140. The Ethernet/Internet stack used by HSE consists of Distributed Host Control Protocol (DHCP) 285, Simple Network Time Protocol (SNTP) 286, and Simple Network Management Protocol (SNMP) 287, which in turn use Transport Control Protocol (TCP) 283 and User Data Protocol (UDP) 284 services.

TCP 283 and UDP 284 in turn use the standard Internet Protocol (IP) 282 services, which uses the standard IEEE Ethernet 802.3 Media Access Control (MAC) and Physical (PHY) Layers 281. The PHY layer in 281 connects to one or more Ethernet Networks 140.

The Internet DHCP, SNTP, SNMP, TCP, UDP and IP protocols are specified by the Internet Engineering Task Force (IETF) Request For Comment (RFC) specifications. The IETF RFCs are listed in Appendix B herein, which are hereby incorporated by reference herein in their entireties. An Institute of Electrical and Electronics Engineers (IEEE) standard (IEEE 802.3), the entirety of which is hereby incorporated by reference herein, describe the Ethernet MAC and PHY layers. The specific use of each layer and protocol are detailed in the Ethernet Presence Specification FF-586 listed in Reference Set 2 of Appendix A herein.

By preserving the standard use of the Ethernet/Internet stack, the HSE system architecture ensures interoperability among the different stack manufacturers.

A.5: HSE Management Agent

Again referring to FIG. 2, in general, the HSE Management Agent 270 uses DHCP 285 for acquiring an IP address for the device, SNTP 286 for maintaining time synchronization with a time server, and SNMP 287 for managing the TCP, UDP, and IP protocol layers. HSE Management Agent use of DHCP, SNTP and SNMP is routine and complies with standard practices known to those familiar with the Internet protocols, e.g., according to IEEE 802.3.

The HSE Management Agent uses SNMP 287 for managing the Internet layer protocols. Specifically, the HSE Management Agent 270 provides Ethernet Network access to the standard Management Information Base-II (MIB II) as defined by SNMPv2 in RFC 1213 and RFC 1643 (see Appendix B), and as defined also by Ethernet Presence FF-586 listed in Reference Set 2 of Appendix A herein.

Figure 3:
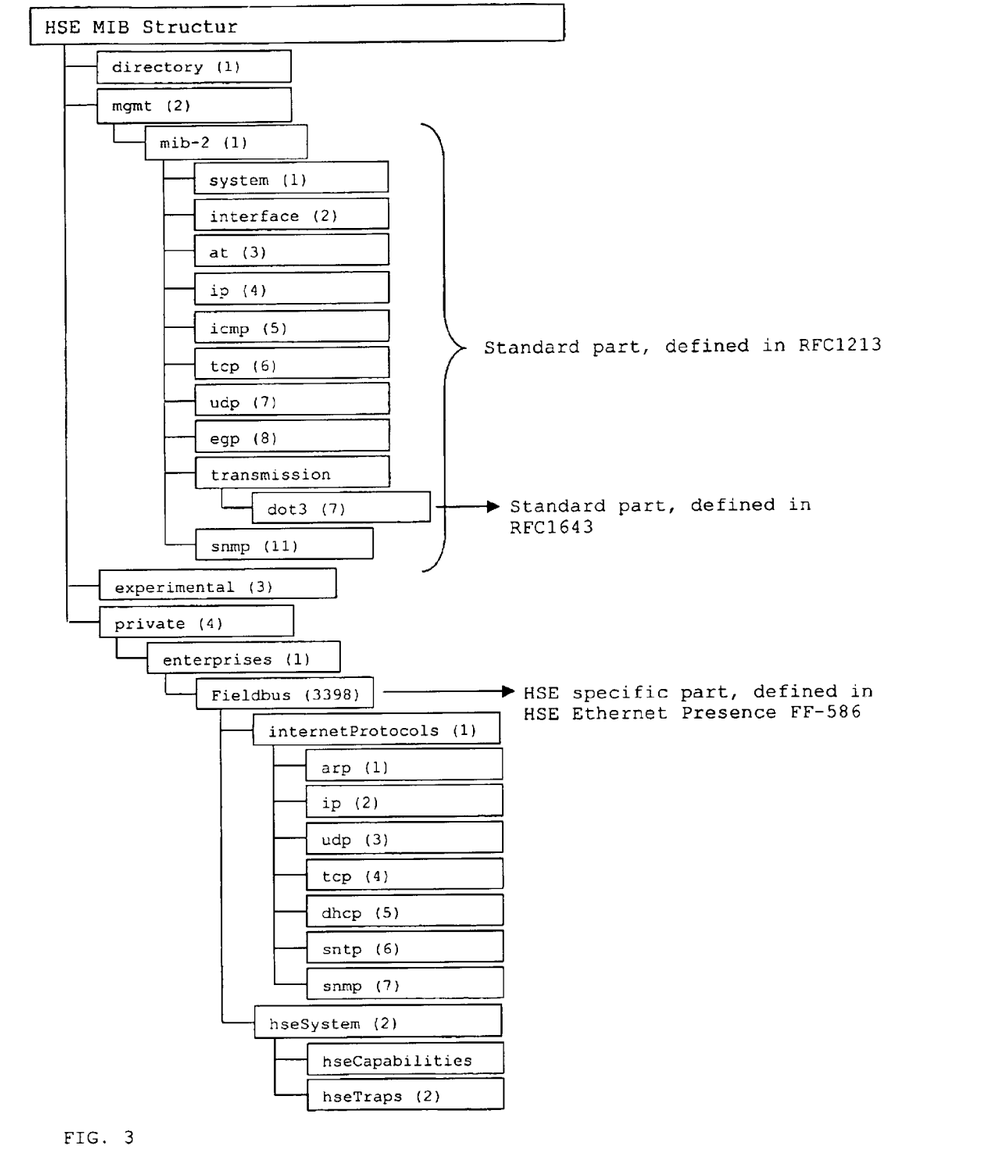
FIG. 3 is a block diagram showing an exemplary embodiment of the structure of the High Speed Ethernet Management Information Base of the device system architecture shown in FIG. 2.

In accordance with an embodiment of the present invention, in order to comply with the ISO standards, the HSE Management Information Base (HSE MIB) 271 comprises of a standard part, which is the second version of MIB-II as defined in RFC 1213 and a HSE specific part (which is defined under the private enterprises level). For convenience in understanding, the detailed structure of the HSE MIB 271 is shown in FIG. 3. The standardized structure of the HSE MIB 271 provides a profile allowing interoperability, making the device appear as a well-behaved node.

B: HSE Core

Referring again to FIG. 2, the HSE core portion 200 of the HSE system architecture identifies the new HSE capability in accordance with the principles of the present invention. The HSE core 200 provides the essential capabilities and integration needed to realize the high performance distributed control using HSE Devices, HSE Linking Devices and standard COTS Ethernet equipment.

B.1: Network Management Agent Virtual Field Device

The HSE System Architecture includes a Network Management Agent VFD (NMA VFD) 210 for each HSE Device and each HSE Linking Device. The NMA VFD provides means for configuring, controlling and monitoring HSE Device and HSE Linking Device operation from the network.

Management information is contained in the Network Management Information Base (NMIB) 213 and the System Management Information Base (SMIB) 212. Using the configuration management capabilities of the NMA VFD, parameters are set in the NMIB and SMIB to support data exchanges with other devices in the system. This process involves defining the transfers between devices and then selecting the desired communications characteristics to support the transfers.

The NMA VFD can also be configured to collect performance and fault related information for selected transfers. This information is accessible during run-time, making it possible to view and analyze the behavior of device communications. If a problem is detected, performance is to be optimized, or device communications are to be changed, then reconfiguration can be performed dynamically while the device is still operating.

NMA VFD parameters and behavior are further defined in the HSE Network Management Specification FF-803 listed in the Reference Set 2 of Appendix A herein.

B.2: HSE Field Device Access Agent

The HSE Field Device Access (FDA) Agent will now be described with References to FIG. 4, which is the same figure as FIG. 2 except that Local Interactions (291–299) for the HSE Field Device Access (FDA) Agent 290 are shown. The operation of the HSE FDA Agent will now be described in terms of these local interactions.

One of the main functions of the HSE FDA Agent 290 is to map services already defined for FOUNDATION™ fieldbus System Management (SM) (See FF-880 listed in the Reference Set 1 of Appendix A herein) and Fieldbus Message Specification (FMS) (See FF-870 listed in the Reference Set 1 of Appendix A herein) to and from the standard, COTS Ethernet/Internet 280 component.

Generally, the HSE FDA Agent 290 emulates the mapping defined by the FOUNDATION™ fieldbus Fieldbus Access Sublayer specification (See FF-875 listed in the Reference Set 1 of Appendix A herein). The HSE FDA Agent 290 provides the common interface that enables remote applications to access devices of any type on both the H1 Networks 150 and the HSE Network 140.

Thus the HSE FDA Agent 290 in accordance with the principles of the present invention allows systems to be constructed where the control is distributed in into various HSE Devices and/or H1 Devices, and any combinations thereof, as needed by the particular end user application.

B.2.1: HSE FDA Agent Local Interfaces

B.2.1(a): Local Interface 291: TCP—The TCP local interface 291 allows the HSE FDA Agent 290 to send and/or receive FMS messages using TCP 283. TCP 283 provides interfaces modeled as sockets through which the HSE FDA Agent 290 submits a buffer that contains one or more messages.

B.2.1(b): Local Interface 292: UDP—The UDP local interface 292 allows the HSE FDA Agent 290 to send and/or receive SM messages and certain FMS messages using UDP 284. UDP 284 provides interfaces modeled as sockets through which the HSE FDA Agent 290 submits a buffer that contains one or more messages.

B.2.1(c): Local Interface 293: HSE NMIB—The HSE FDA Agent 290 provides a local interface to the HSE NMIB 213 in NMA VFD 210. The HSE FDA Agent is capable of providing configuration and read-only access to NMA VFD 210 via the HSE NMIB Local Interface 293.

B.2.1(d): Local Interface 294: HSE SMIB—The HSE FDA Agent 290 provides a local interface to the HSE SMIB 212 in NMA VFD 210. The HSE FDA Agent 290 is capable of providing configuration and read-only access to NMA VFD 210 via the HSE SMIB Local Interface 294.

B.2.1(e): Local Interface 295: HSE SMK—The HSE FDA Agent 290 conveys HSE SM services to and from the HSE SMK 220 through the HSE SMK local interface 295. In accordance with an embodiment of the present invention, in a HSE Linking Device, the HSE SMK 220 communicates locally with each of the H1 interfaces 240, and does not use the HSE FDA Agent 290.

B.2.1(f): Local Interface 296: HSE LRE—The HSE FDA Agent 290 maintains a local interface with the HSE LAN Redundancy Entity (HSE LRE) 230 of the device through the HSE LRE local interface 296. Use of the HSE LRE local interface 296 will be described in more detail later.

B.2.1(g): Local Interface 297: H1 Interface—Only HSE FDA Agents 290 of a HSE Linking Device interact with the H1 Interface(s) 240 to access H1 Networks 150. The H1 local interface provides the HSE FDA Agent with FMS and SM access through the HSE SMK 220.

The HSE FDA Agent forwards FMS requests and responses received from the TCP Interaction 291 and UDP Interaction 292 to Hi Network 150 through the H1 Interface (s) 240. The HSE FDA Agent also forwards H1 requests and responses received from a H1 Network through the H1 Interface Interaction 297 to the Ethernet Network 140 using TCP Interaction 291 and UDP Interaction 292.

Thus, the HSE FDA Agent 290 interacts with the services in the H1 Network in the same manner as any other application program would normally interact with the H1 network.

B.2.1(h): Local Interface 298: FBAP VFD—The HSE FDA Agent 290 uses the FBAP VFD local interface 298 to access the FBAP VFD 260. Both FMS and SM messages are communicated using the FBAP VFD local interface 298.

B.2.1(i): Local Interface 299: HSE Management Agent—The HSE FDA Agent 290 maintains the HSE Management Agent local interface 299 with the HSE Management Agent 270 to access certain Quality of Service parameters associated with its UDP/TCP connections. The use of these parameters by the HSE FDA Agent 290 is local to the specific UDP/TCP implementation.

B.2.2: HSE FDA Agent Operation

Again referring to FIG. 4, during the configuration of the system, HSE SMK 220 uses the local interface 295 for adding HSE and/or H1 devices to, and deleting the same from, the distributed system. An exchange of SM messages is used to identify new (or to be deleted) HSE and/or H1 Devices in the system.

For example, after a new HSE Device receives an Internet Protocol (IP) address, the new HSE Device periodically announces its presence on the Ethernet network 140. HSE Linking Devices also announce changes detected on their H1 Network 150. In a similar way, HSE SMK uses the local interface 295 to determine the location of the function block "tags" that might exist in the HSE Devices and/or H1 Devices.

During operation of the system, the data acquisition, display and supervisory control functions, which are typically executing on a Personal Computer (PC) connected to the Ethernet Network 140, will need to access the data in a HSE Device, a HSE Linking Device and/or H1 devices connected to the H1 Networks 150. The data access is typically performed using the "Client/Server" and/or the "Publisher/Subscriber" messages. These data access methods are well known to those familiar with Fieldbus messaging.

For Client/Server and Publisher/Subscriber messages originating or terminating in the HSE Device and/or HSE Linking Device, the HSE FDA Agent 290 sends and receives the Ethernet Network 140 messages on the local interface 291, provides the appropriate mapping to FMS services as previously described above, and uses local interfaces 293, 294, 296, 298, and 299 to access the HSE NMIB 213, HSE SMIB 212, HSE LRE 230, FBAP VFD(s) 260 and the HSE Management Agent 270, respectively. HSE SMK 220 is not accessed because it has its own SM messages as previously described.

For Client/Server, Publisher/Subscriber and/or SM messages originating or terminating in the H1 Network 150, the HSE FDA Agent 290 uses local interface 297 to send and/or receive messages from H1 Interface(s) 240.

If the messages from the H1 network 150 are to/from the Ethernet Network 140, and are Client/Server or Publisher/Subscriber messages, HSE FDA Agent 290 uses the FMS mapping and local interface 291. If the H1 messages to/from the Ethernet Network 140 are SM messages, the HSE FDA Agent uses the SM mapping and local interface 292.

If the messages to/from H1 Network 150 are to/from the HSE Linking Device, and are Client/Server or Publisher/Subscriber messages, HSE FDA Agent will use FMS mapping and the appropriate local interface (except the local interfaces 291 and 292).

If the messages to/from H1 Network 150 are to/from the HSE Linking Device, and are SM messages, HSE FDA Agent will use SM mapping and the appropriate local interface (except the local interfaces 291 and 292).

B.3: HSE System Management Kernel

Referring again to FIG. 2, the HSE system architecture includes a HSE System Management Kernel (SMK) 220 for each HSE device and/or each HSE linking device. The HSE SMK 220 maintains information and a level of coordination that provides an integrated network environment for the execution and interoperation of the FBAP VFD 260.

As previously discussed, HSE SMK 220 provides for routine configuration of certain basic system information prior to device operation. For example HSE SMK startup takes a device through a set of predefined phases for this purpose. During this procedure a system configuration device recognizes the presence of the device on the network and configures basic information into the HSE SMIB 212. Once the device receives its basic configuration information, its HSE SMK brings it to an operational state without affecting the operation of other devices on the network. It also enables the HSE FDA Agent 290 for use by other functions in the device.

B.3.1: HSE SMK System Time Synchronization

Figure 5:
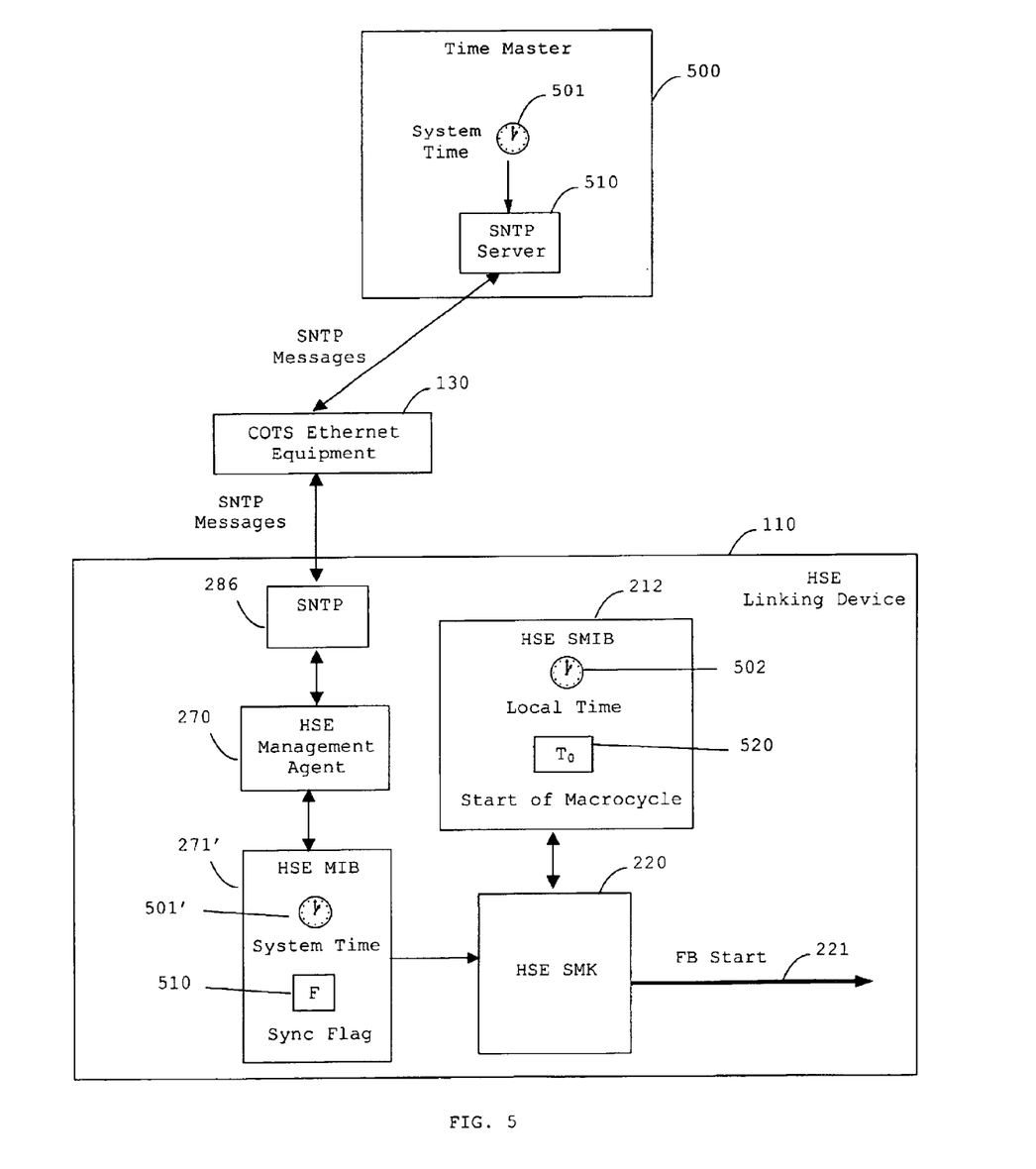
FIG. 5 is a block diagram showing an exemplary embodiment of the relevant portions of the high performance distributed control system involved in time synchronization process in accordance with the principles of the present invention.

Now referring to FIG. 5, the HSE Management Agent 270 in HSE Linking Device 110 uses SNTP 286 to interact with remote SNTP Server 510 in Time Master 500 to synchronize System Time 501' in HSE MIB 271' with System Time 501 in the Time Master 500. When System Time 501' is synchronized with System Time 501, Sync Flag (F) 510 in HSE MIB is set to true by the standard SNTP protocol. The Time Master and the HSE Linking Device are interconnected using standard, COTS Ethernet equipment 130. This synchronization protocol is defined in IETF RFC 2030.

At any moment, Local Time 502 in HSE SMIB 212 may or may not be synchronized with System Time 501'. In order to coordinate execution of function blocks in a distributed system, and to provide proper time stamping of function block alarms, Local Time 502 must be Synchronized with System Time 501'.

All of the function blocks are synchronized with Start of Macrocycle, "$T_0$" 520 in HSE SMIB 212. Each HSE Linking Device and HSE Device in the system has the same value for $T_0$. A function block is executed when HSE SMK 220 locally issues a Function Block (FB) Start 221 message for the block. Each FB Start message is generated based on an offset from $T_0$.

At the start of the macrocycle, $T_0$ and the offset for each block is based on Local Time 502. Therefore each device must adjust their Local Time 502 to equal the System Time 501' for the system to function properly. However, because each device has a hardware clock oscillator that is not perfect, Local Time 502 will eventually drift out of synchronization with System Time 501'.

Figure 6:
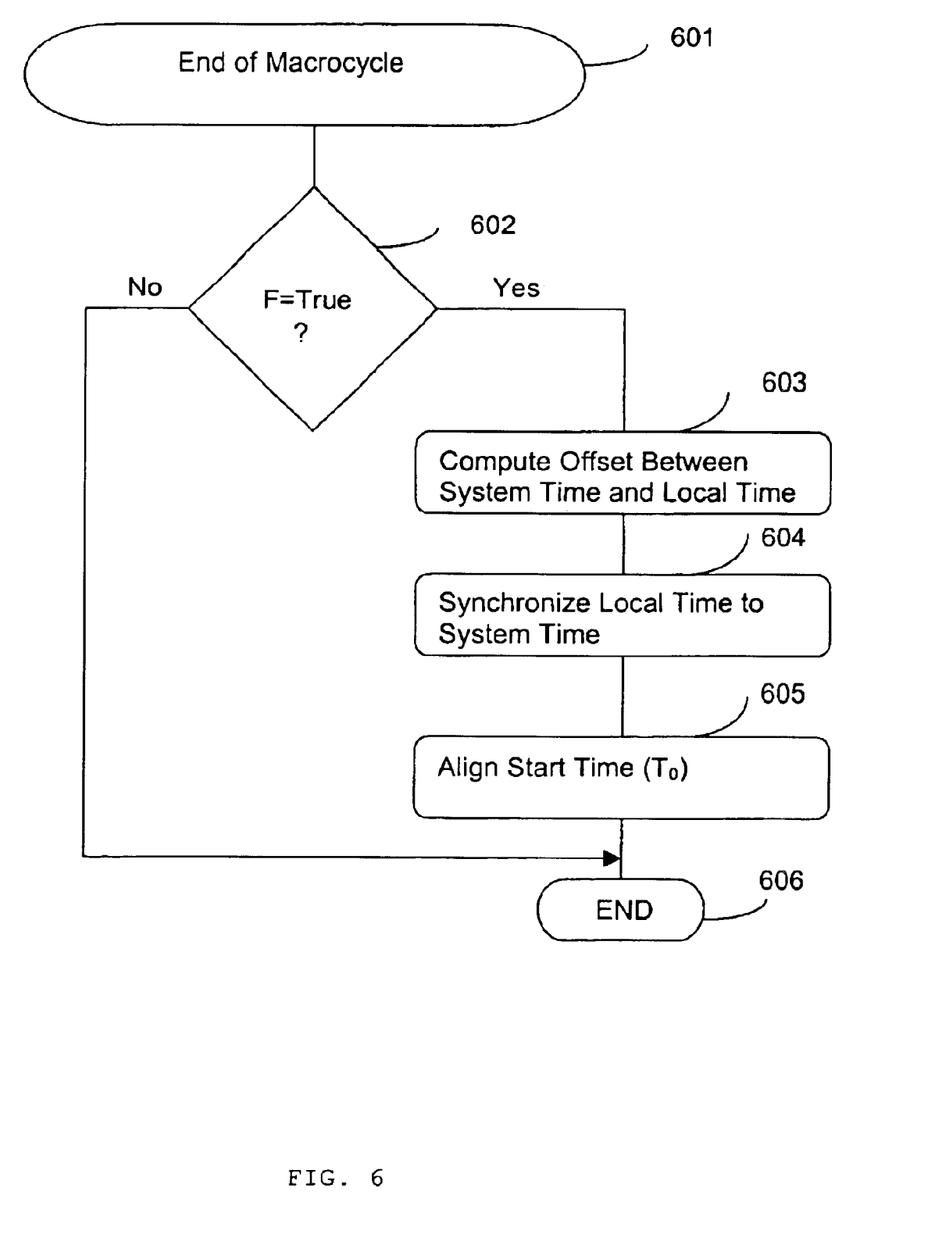
FIG. 6 is a flow diagram illustrative of an exemplary embodiment of the process of time synchronization in accordance with an embodiment of the principles of the present invention.

FIG. 6 shows the process of correcting for the drift in accordance with an embodiment of the present invention. In particular, when a macrocycle ends in step 601, the HSE SMK 220 will test the Sync Flag 510 in HSE MIB 271' in step 602. If F 510 is not true, the process ends in step 606.

If, on the other hand, it is determined in step 602 above that F 510 is true, HSE SMK 220 computes the offset between Local Time 502 and System Time 501' in step 603, and sets the Local Time 502 to equal the System Time 501' within a value specified in a desired time sync class (See Reference Set 1 of Appendix A herein) in step 604.

Once the Local Time 502 is synchronized, in step 605, the start time ($T_0$) 520 (shown in FIG. 5) is aligned with start time of other devices.

Figure 7A:
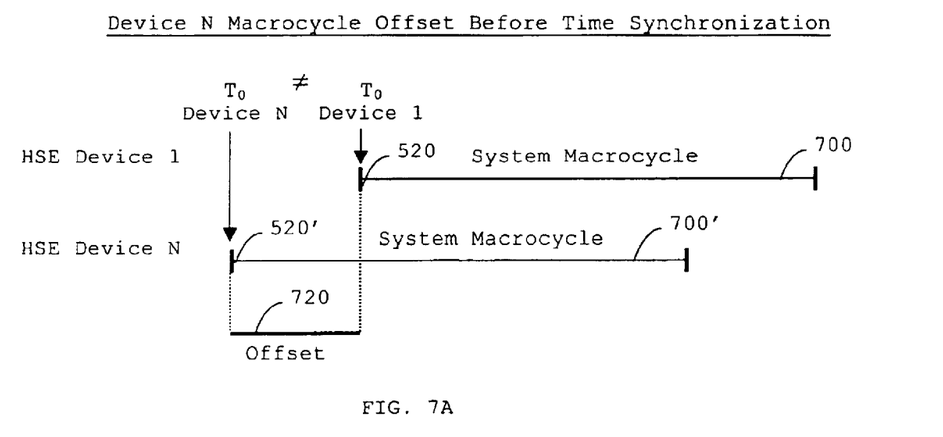
FIG. 7A is a timing diagram illustrative of a starting time offset before the time synchronization process in accordance with an embodiment of the principles of the present invention.

The start time alignment will now be described with references to FIGS. 7A and 7B. FIG. 7A shows the macrocycle offset of a device, e.g., device N, before the time synchronization, in which the offset 720 represents the error that must be corrected in the HSE Device N. As shown, the HSE Device N now has the correct Local Time, but the start time ($T_0$) 520' of System Macrocycle 700' is not aligned with other devices in the distributed system.

Figure 7B:
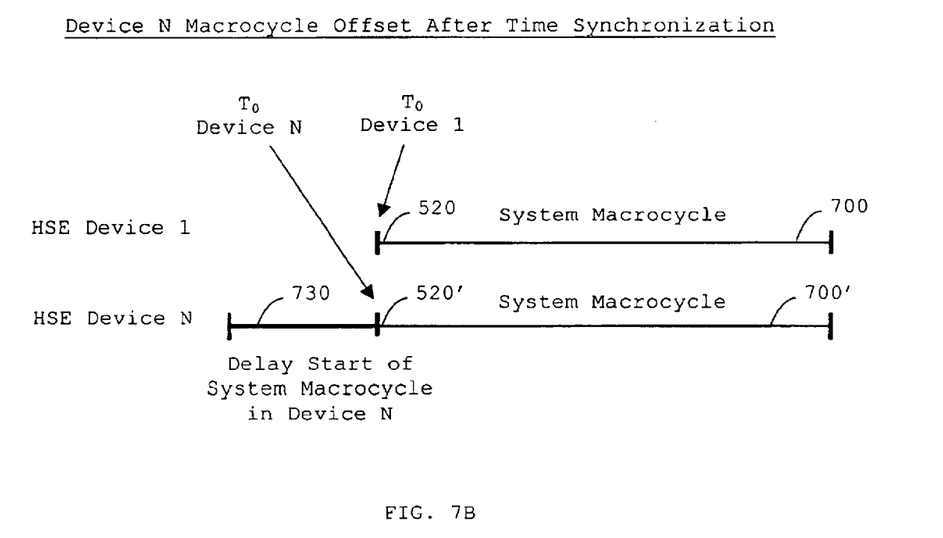
FIG. 7B is a timing diagram illustrative of a starting time offset after the time synchronization process in accordance with an embodiment of the principles of the present invention.

FIG. 7B shows the macrocycle offset of a device, e.g., device N, after the time synchronization. The HSE SMK 220 of the Device N delays the start time ($T_0$) 520' of the System Macrocycle 700' by Offset 720 so that the System Macrocycle begins at the same time ($T_0$) 520 as, e.g., System Macrocycle 700 in HSE Device 1. HSE Device N System Macrocycle is now synchronized with the System Time, and the synchronization process ends at step 606 (shown in FIG. 6).

B.4: Local Area Network Redundancy Entity

Figure 4:
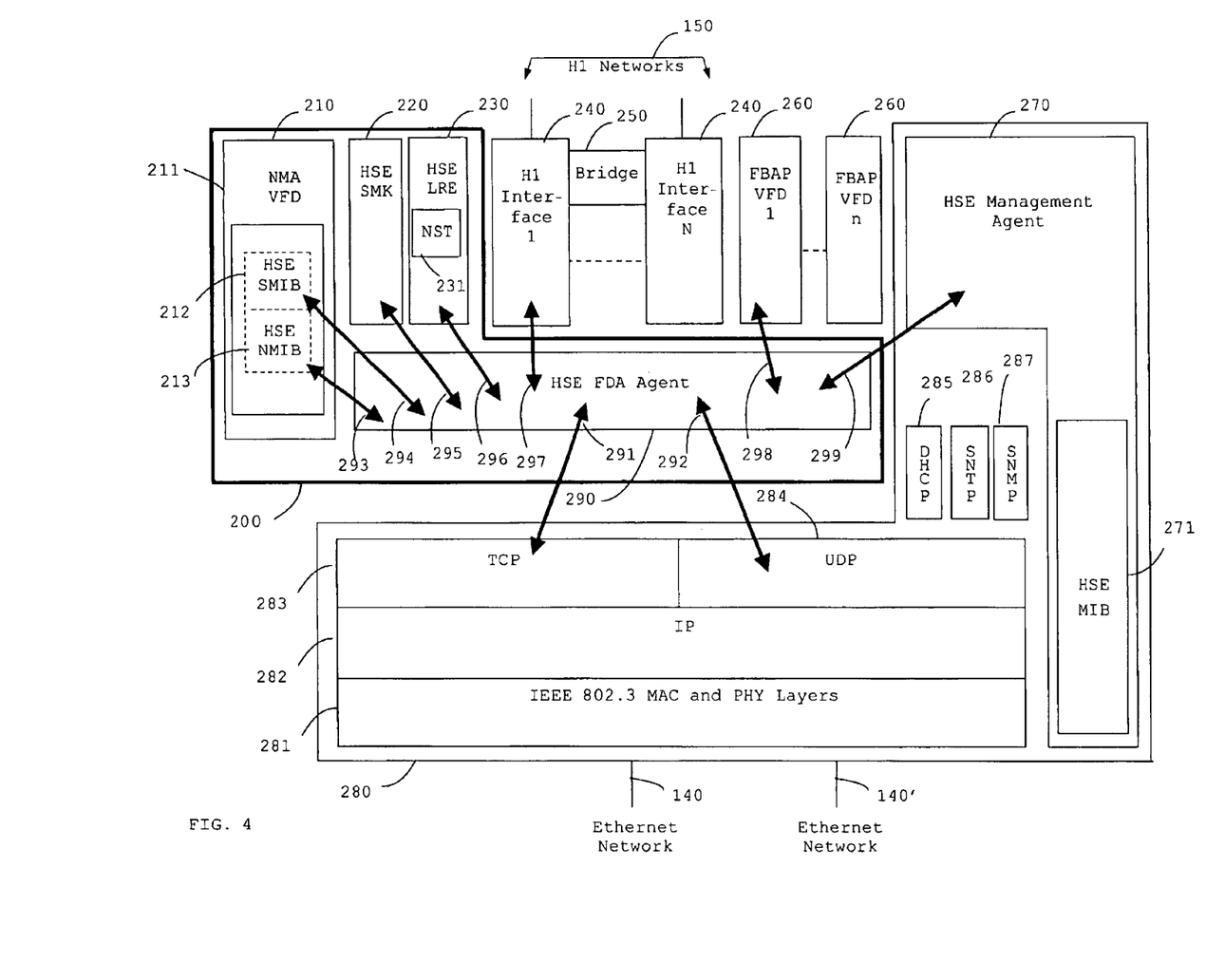
FIG. 4 is a block diagram showing an exemplary embodiment of the device system architecture shown in FIG. 2, showing the various local interfaces of the High Speed Ethernet Field Device Access agent.

Referring to FIG. 4, each HSE Device and HSE Linking Device has a HSE Local Area Network (LAN) Redundancy Entity (HSE LRE) 230. The HSE LRE provides fault tolerance to single failure through the use of redundancy.

HSE LRE periodically sends and receives Redundancy Diagnostic Messages over local interface 296. HSE FDA Agent 290 maps the Diagnostic messages on local interfaces 291 and 292 (See HSE Redundancy Specification FF-593 listed in the Reference Set 2 of Appendix A herein for the Redundancy Diagnostic Message Formats.)

The Redundancy Diagnostic Messages are sent concurrently on Ethernet Network 140 and Ethernet Network 140'. Each device receives the Redundancy Diagnostic Messages on Ethernet Network 140 and Ethernet Network 140' and constructs a local Network Status Table (NST) 231. The NST provides detailed status on the condition of every HSE device connected to Ethernet Network 140 and Ethernet Network 140'. The HSE LRE 230 controls which Ethernet Network 140 or 140' the HSE Device will use for message transmission.

With this method, all of the network transmission and device switchover decisions are distributed into the HSE Devices and the system uses standard, COTS Ethernet equipment.

Figure 8:
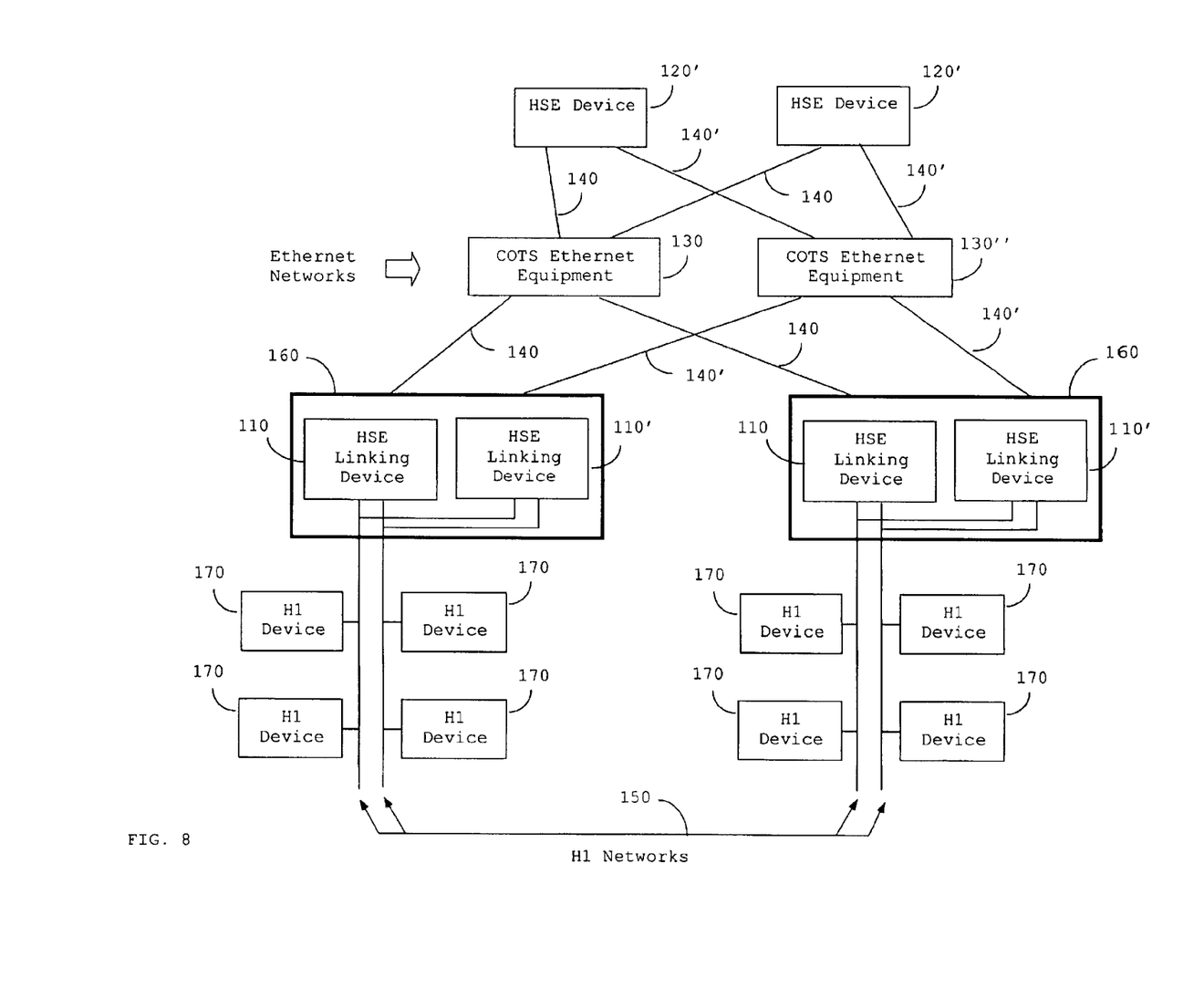
FIG. 8 is a block diagram showing an exemplary embodiment of the redundant topology of a high performance distributed control system in accordance with the principles of the present invention.

FIG. 8 illustrates the general topology supported by the redundancy aspect of the present invention. The topology shown is only an example, showing one of many possible topologies. Any topology may be used as long as behavior of the equipment providing Ethernet Networks 140 and 140' is standard, COTS Ethernet equipment.

HSE redundancy supports both Ethernet Network redundancy and HSE Linking Device redundancy.

B.4.1: Ethernet Network Redundancy

Referring to FIG. 8, HSE Devices 120' and HSE Linking Device Pairs 110' have interfaces to both Ethernet Network 140 and Ethernet Network 140'. In this example, Ethernet Network 140 is provided by COTS Ethernet equipment 130 and Ethernet Network 140' is provided by COTS Ethernet equipment 130'. A single failure of any one of the Ethernet Networks or one of the Ethernet interfaces on a HSE device would cause the HSE LRE previously described to force communications on the remaining functional network.

B.4.2: HSE Linking Device Redundancy

The HSE LRE 230 supports HSE Linking Device redundancy. Redundant HSE Linking Device Pair 160 comprises primary HSE Linking Device 110, and standby HSE Linking Device 110'. H1 Devices 170 are connected by H1 Networks 150 to the Redundant HSE Linking Device Pair 160. If primary HSE Linking Device 110 fails, standby HSE Linking Device 110' will assume control. A HSE device 120' may be made redundant in the same manner as the HSE linking device 110, except in a HSE device H1 interface(s) is (are) not present.

The present invention provides the necessary diagnostic message format to allow an open and interoperable switchover of the redundant high speed Ethernet networks and/or the redundant HSE linking devices (or HSE devices).

The redundancy method for backup of each H1 Network is described in the '178 application, and by the specifications listed in Reference Set 1 of Appendix A herein.

As can be appreciated, the distributed control system architecture in the foregoing description provides an open, interoperable solution optimized for integration of distributed control systems and other control devices in a high performance backbone, provides an open, interoperable solution that provides system time synchronization suitable for distributed control applications operable over a high performance backbone, and provides an open, interoperable solution that provides a fault tolerant high performance backbone as well as fault tolerant devices that are connected to the backbone.

The preferred embodiments set forth above are to illustrate the invention and are not intended to limit the present invention. Additional embodiments and advantages within the scope of the claimed invention will be apparent to one of ordinary skill in the art.

Moreover, while the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

APPENDIX A

| Number | Revision | Specification |
|---|---|---|
| | | A.1 Reference Set 1 |
| FF-801 | FS 1.4 | Network Management |
| FF-806 | FS 1.0 | Data Link Protocol - Bridge Operation Addendum |
| FF-821 | FS 1.4 | Data Link Services Subset |
| FF-822 | FS 1.4 | Data Link Protocol Subset |
| FF-870 | FS 1.4 | Fieldbus Message Specification |
| FF-875 | FS 1.4 | Fieldbus Access Sublayer |
| FF-880 | FS 1.4 | System Management |
| FF-890 | FS 1.4 | Function Block Application Process-Part 1 |
| | | A.2 Reference Set 2 |
| FF-803 | FS 1.0 | HSE Network Management |
| FF-586 | FS 1.0 | HSE Ethernet Presence |
| FF-588 | FS 1.0 | HSE Field Device Access Agent |
| FF-589 | FS 1.0 | HSE System Management |
| FF-593 | PS 2.0 | HSE Redundancy |

APPENDIX B

| RFC Number | RFC Title |
|---|---|
| 768 | User Datagram Protocol (UDP) |
| 791 | Internet Protocol (IP) Amended by: IP Subnet Extensions, RFC 950 IP Broadcast Datagrams, RFC 919 IP Broadcast Datagrams with Subnets, RFC 922 |
| 792 | Internet Control Message Protocol (ICMP) |
| 793 | Transport Control Protocol (TCP) |
| 826 | Ethernet Address Resolution Protocol (ARP) |
| 894 | Ethernet Framing of IP Datagrams over Ethernet |
| 1042 | IEEE 802.2 & 3 Framing of IP Datagrams over Ethernet |
| 1112 | Internet Group Management Protocol (IGMP) |
| 1122 | Requirements for Internet Hosts -- Communication Layers |
| 1155 | Structure and Identification of Management Information |
| 1157 | Simple Network Management Protocol (SNMP) |
| 1213 | Management Information Base-II (MIB II) |
| 1533 | DHCP Options and BOOTP Vendor Extensions |
| 1541 | Dynamic Host Configuration Protocol (DHCP) |
| 1643 | Definitions of Managed Objects for the Ethernet-like Interface Types |
| 2030 | Simple Network Time Protocol (SNTP) |

What is claimed is:

1. An apparatus in a distributed control system, comprising:

a first network interface for communicating with a first network having a communication protocol stack; and a High Speed Ethernet core further comprising:

a device access agent which emulates mapping of an access sublayer of at least one legacy format service message of said distributed control system to one or more network format messages compatible with said communication protocol stack using a common access interface; whereupon mapping of the at least one legacy format service message to one or more network format messages, the one or more network format messages are communicated to at least one second apparatus connected to the first network, wherein both the apparatus and the at least one second apparatus actively control respective functions performed by the distributed control system.

2. The apparatus according to claim 1, wherein:
said first network comprising an Ethernet network.

3. The apparatus according to claim 2, further comprising:
a high speed Ethernet management agent for managing transport control protocol, user data protocol, and Internet protocol layers of said communication protocol stack; and
a high speed Ethernet management agent interface through which said device access agent communicates with said high speed Ethernet management agent.

4. The apparatus according to claim 3, further comprising:
a user data protocol local interface through which said device access agent communicates with a user data protocol layer of said communication protocol stack.

5. The apparatus according to claim 4, further comprising:
a transport control protocol local interface through which said device access agent communicates with a transport control protocol layer of said communication protocol stack.

6. The apparatus according to claim 5, wherein said high speed Ethernet management comprises:
a management information base constructed with a standardized structure to thereby allow an open and interoperable profile, and to make said apparatus to appear as a well behaved node.

7. The apparatus according to claim 1, further comprising:
a network management information base for storing information necessary for managing operation of said distributed control system; and
a network management information base local interface through which said device access agent communicates with said network management information base.

8. The apparatus according to claim 7, further comprising:
a system management information base for storing system configuration information of said apparatus; and
a system management information base local interface through which said device access agent communicates with said system management information base.

9. The apparatus according to claim 1, further comprising:
a system management kernel for configuring said apparatus and storing system configuration information in a system management information base; and
a system management kernel local interface through which said device access agent communicates with said system management kernel.

10. The apparatus according to claim 9, further comprising:
a local time clock for providing local time for use within said apparatus; and
a system time clock for providing a system time across said distributed control system;
wherein said system management kernel synchronizes said local time clock with said system time clock.

11. The apparatus according to claim 10, further comprising:
a redundancy entity for sending and receiving diagnostic information; and
a redundancy entity local interface through which said device access agent communicates with said redundancy entity.

12. The apparatus according to claim 11, wherein:
said first network interface comprises a redundant plurality of first network interfaces;
wherein said first network comprises a redundant plurality of first networks; and
wherein said redundancy entity maintains a network status table indicating diagnostic status of said distributed control system to select operational one of said redundant plurality of first network interfaces based on said network status table.

13. The apparatus according to claim 1, further comprising:
at least one function block application process virtual field device providing standardized definitions of at least one of inputs, outputs, algorithms, control variables, and behavior of said distributed control system; and
at least one function block application process virtual field device interface through which said device access agent communicates with said at least one function block application process virtual field device.

14. The apparatus according to claim 1, further comprising:
a second network interface for communicating with a second network using said at least one legacy format service message.

15. An open interoperable apparatus in a distributed control system, comprising:
a redundant plurality of first network interfaces for communicating with respective ones of a redundant plurality of first networks having a communication protocol stack; and
a High Speed Ethernet core further comprising
a redundancy entity configured to send and receive diagnostic information through said redundant plurality of first network interfaces, said redundancy entity maintaining a network status table indicating diagnostic status of said redundant plurality of first networks, and said redundancy entity being configured to select an operational one of said redundant plurality of first networks based on said network status table.

16. The open interoperable apparatus according to claim 15, wherein the High Speed Ethernet core further comprises:
a device access agent for mapping at least one legacy format service message of said distributed control system to a network format messages compatible with said communication protocol stack; and
a redundancy entity local interface through which said device access agent communicates with said redundancy entity.

17. The open interoperable apparatus according to claim 16, further comprising:
a system management kernel for configuring said apparatus and synchronizing a local time clock, which provides a local time for use within said apparatus, with a system time clock, which provides a system time across said distributed control system; and
a system management kernel local interface through which said device access agent communicates with said system management kernel.

18. An open interoperable distributed control system, comprising:
   at least one first network having a communication protocol stack; and
   at least one device in communication with said at least one first network, said at least one device having an access agent for mapping at least one legacy format service message of said open interoperable distributed control system to a network format message compatible with said communication protocol stack; whereupon mapping of the at least one legacy format service message to one or more network format messages, the one or more network format messages are communicated via the at least one first network to at least one second apparatus connected to the at least one first network, wherein both the apparatus and the at least one second apparatus actively control the distributed control system.

19. The open interoperable distributed control system according to claim 18, wherein: said at least one first network comprises a commercial off-the-shelf Ethernet network.

20. The open interoperable distributed control system according to claim 18, wherein said at least one device further comprises:
   a system management kernel for configuring said apparatus and synchronizing a local time clock, which provides a local time for use within said apparatus, with a system time clock, which provides a system time across the distributed control system; and
   a system management kernel local interface through which said device access agent communicates with said system management kernel.

21. The open interoperable distributed control system according to claim 18, wherein:
   said at least one first network comprises a redundant plurality of first networks; and
   wherein said at least one device further comprise:
      a redundancy entity configured to send and receive diagnostic information to and from said redundant plurality of first networks, said redundancy entity maintaining a network status table indicating diagnostic status of said redundant plurality of first networks, and said redundancy entity being configured to select an operational one of said redundant plurality of first networks based on said network status table.

22. The open interoperable distributed control system according to claim 21, wherein:
   said redundant plurality of first networks comprises a redundant plurality of commercial off-the-shelf Ethernet networks.

23. The open interoperable distributed control system according to claim 18, further comprising:
   a plurality of second networks, each of said plurality of second networks using said at least one legacy service message format;
   wherein said at least one device comprises a redundant plurality of devices, each of said redundant plurality of devices comprises:
      a plurality of second network interfaces for communicating with said plurality of second networks; and
      a redundancy entity configured to provide information necessary for selection of an operational one of said redundant plurality of devices based on a network status table indicating diagnostic status of at least one of said redundant plurality of devices and said at least one first network.

24. A method of synchronizing a plurality of device specific local times and a system time in an open interoperable distributed control system, said plurality of device specific local times being associated with respective ones of devices in said open interoperable distributed control system, said method comprising:
   detecting an end of a previous operational cycle;
   providing a start time of a next operational cycle to each of said plurality of devices;
   computing an offset between each of said plurality of device specific local times and said system time;
   synchronizing each of said plurality of device specific local times with said system time suing said computed offset; and
   aligning said plurality of device specific local times with respect to each other so that said start time of said plurality of devices coincide.

25. The method of synchronizing a plurality of device specific local times and a system time in accordance with claim 24, further comprising:
   providing a time master in said open interoperable distributed control system, said time master maintaining a global time;
   determining whether said system time is synchronized with said global time; and
   setting a synchronized flag if it is determined that said system time is synchronized with said global time.

26. of synchronizing a plurality of device specific local times and a system time in accordance with claim 24, wherein said step of aligning said plurality of device specific local times comprises:
   computing an offset between each of said plurality of device specific local times with respect to each other; and
   adding a time delay to at least one of said plurality of device so that said start time of each of said plurality of devices coincide with respect to each other.

27. An open interoperable apparatus in a distributed control system, the open interoperable apparatus comprising:
   a High Speed Ethernet core:
   a local time clock for providing a local time for use within said open interoperable apparatus;
   a system time clock for providing a system time across said distributed control system; and
   a system management kernel for synchronizing said local time clock with said system time clock;
   wherein at least one of said local time clock, said system time clock and said system management kernel are utilized by the High Speed Ethernet core to control at least one operation of the open interoperable apparatus wherein information relevant to the at least one operation is mapped by the High Speed Ethernet core from at least one legacy format service message to one or more network format messages and the one or more network format messages are communicated to at least one second open interoperable apparatus in the distributed control system.

28. The open interoperable apparatus in accordance with claim 27, further comprising:
   a first network interface for communicating with a first network having a communication protocol stack;

a device access agent which emulate mapping of an access sublayer of at least one legacy format service message of said distributed control system to a network format message compatible with said communication protocol stack; and a system management kernel local interface through which said device access agent communicates with said system management kernel.

29. An apparatus in a distributed control system, comprising:

a first network interface for communicating with a first network having a communication protocol stack; and a device access agent that maps an access sublayer of at least one legacy format service message of said distributed control system to a network format message compatible with said communication protocol stack; whereupon mapping of the at least one legacy format service message to one or more network format messages, the one or more network format messages are communicated to at least one second apparatus connected to the first network, wherein both the apparatus and the at least one second apparatus actively control respective functions performed by the distributed control system.

30. An apparatus for mapping a message in a first format into a second format, wherein the second format is compatible for use with at least one of an H1 fieldbus compatible device and a High Speed Ethernet device comprising:

a High Speed Ethernet management agent;

a protocol stack, under the control of the High Speed Ethernet management agent;

an H1 Interface, for connecting the apparatus to an H1 network, when the apparatus is an H1 fieldbus compatible device; and a High Speed Ethernet core, further comprising:

a field device access agent which facilitates mapping of messages in the first format into the second format and the mapping of messages in the second format into the first format;

an H1 Interface local interface through which the field device access agent communicates with the H1 interface, when the High Speed Ethernet core is in communication with an H1 fieldbus compatible device.

31. The apparatus of claim 30 wherein the protocol stack further comprises a standard Ethernet stack.

32. The apparatus of claim 31 wherein the High Speed Ethernet core further comprises at least one of a user data protocol local interface, by which the field device access agent communicates with a user data protocol layer of the standard Ethernet stack, and a transport control protocol layer interface by which the field device access agent communicates with a transport control protocol layer of the standard Ethernet stack.

* * * * *

UNITED STATES PATENT AND TRADEMARK OFFICE
CERTIFICATE OF CORRECTION

PATENT NO. : 6,826,590 B1
DATED : November 30, 2004
INVENTOR(S) : David A. Glanzer et al.

It is certified that error appears in the above-identified patent and that said Letters Patent is hereby corrected as shown below:

<u>Column 16,</u>
Line 16, delete "suing" and replace with -- using --.
Line 32, after "26." and before "of", insert -- The method --.

Signed and Sealed this

Tenth Day of May, 2005

JON W. DUDAS
*Director of the United States Patent and Trademark Office*